United States Patent

Sweeney et al.

[11] Patent Number: 5,999,302
[45] Date of Patent: Dec. 7, 1999

[54] POLYGON SCANNER HAVING A FLUID FILM BEARING AND ACTIVE CORRECTION OF CROSS-SCAN AND IN-SCAN ERRORS

[75] Inventors: Michael N. Sweeney, Rochester Hills; Edward C. Smith, Sterling Heights; Emery Erdelyi, Oakland Township, all of Mich.; Steve F. Sagan, Sierra Madre, Calif.

[73] Assignee: Speedring Systems, Inc., Rochester Hills, Mich.

[21] Appl. No.: 09/100,634

[22] Filed: Jun. 19, 1998

Related U.S. Application Data

[60] Provisional application No. 60/051,075, Jun. 27, 1997.

[51] Int. Cl.⁶ .................................................. G02B 26/08
[52] U.S. Cl. ........................ 359/216; 359/217; 359/900
[58] Field of Search .................................. 359/216–219, 359/900

[56] References Cited

U.S. PATENT DOCUMENTS

| | | |
|---|---|---|
| 3,961,838 | 6/1976 | Zanoni . |
| 4,002,830 | 1/1977 | Brown et al. . |
| 4,054,360 | 10/1977 | Oosaka et al. . |
| 4,441,126 | 4/1984 | Greenig et al. . |
| 4,475,787 | 10/1984 | Starkweather . |
| 4,746,180 | 5/1988 | Deisler et al. . |
| 4,786,126 | 11/1988 | Kramer . |
| 4,804,981 | 2/1989 | Prakash et al. . |
| 4,893,920 | 1/1990 | Webb . |
| 5,247,174 | 9/1993 | Berman . |
| 5,253,088 | 10/1993 | Narayan et al. . |
| 5,255,108 | 10/1993 | Narayan et al. . |
| 5,281,812 | 1/1994 | Lee et al. . |
| 5,363,127 | 11/1994 | Andrews . |
| 5,365,364 | 11/1994 | Taylor . |
| 5,453,869 | 9/1995 | Kondo . |
| 5,481,384 | 1/1996 | Kramer et al. . |
| 5,606,448 | 2/1997 | Suzuki et al. . |
| 5,610,751 | 3/1997 | Sweeney et al. ........................ 359/197 |

*Primary Examiner*—James Phan
*Attorney, Agent, or Firm*—Vanophem Meehan & Vanophem, P.C.

[57] ABSTRACT

A polygon scanner utilizing a fluid film bearing and method for its use in a flat field imaging device having a relatively large format size, a very high scan rate and high resolution. The polygon scanner has a polygon scan optic connected to a motor, a fluid film bearing, and a windowed enclosure. Repeating cross-scan error components are mapped and actively corrected using a piezoelectric actuator to directly displace the laser element or using a mirror in the optical path that is tilted by means of an electro-optic device to influence a virtual displacement of the optical beam. The repeating components of in-scan errors are similarly, and independently, mapped and corrected by summing with the output of a phase detector in a line scan speed control system. Methods for independently correcting the errors associated with cross-scan and in-scan components in the scan optic are significantly enhanced by the use of a fluid film bearing in general and a self-acting gas bearing in particular, supporting the rotating polygon scan optic. A method for periodic calibration of the cross-scan error map established at the factory may be implemented by a self-calibration sub-routine using a stored sinusoidal voltage waveform. This simplified calibration technique of the invention is enabled by the use of a fluid film bearing in general and a self-acting gas bearing in particular.

4 Claims, 9 Drawing Sheets

POLYGON SCANNER HAVING A FLUID FILM BEARING AND ACTIVE CORRECTION OF CROSS-SCAN AND IN-SCAN ERRORS

This application claims benefits of Provisional application 60/051,075, filed Jun. 27, 1997.

BACKGROUND OF INVENTION

1. Field of the Invention

In general, the present invention relates to a flat field optical scanning system that can produce scan lines at high speeds, high resolution, and large formats. More particularly, the present invention relates to a flat bed optical scanning system with a polygon scanner having a fluid film bearing that accomplishes correction of repeatable and non-repeatable cross scan and in-scan errors such that the associated errors are reduced to negligible levels as the scanned energy of the laser beam is directed to its intended surface.

2. Description of the Prior Art

In a scanning system, the light source is typically a continuous wave gas laser or a laser diode. The laser beam produced by one of these devices is typically first collected by lenses that condition the beam to be either collimated or focused, is then deflected by the scan optic and then focused onto an imaging surface. Conditioning optics may also be part of the scan optic, or placed between the scan optic to influence focusing of the beam, or passive correction of scan curvature, or bearing cross-scan wobble correction using anamorphic optical elements.

Notwithstanding all of the above alternatives, the deflected light beams are scanned into a line that, when combined with a separate linear transport mechanism operating in a direction orthogonal to the scan line, produces a two-dimensional image made up of a series of small dots or pixels. Discrete picture elements (pixels or dots) are created by modulating the laser light source. A laser diode may be modulated directly by varying the applied power. A continuous wave gas laser may be modulated by use of outside means such as an acousto-optic modulator. The imaging surface itself may be either flat or curved, depending upon the optical design configuration and application of the particular scanning device. In a typical cylindrical imaging application, for example, a flexible photo-sensitive material is first loaded onto the inside or outside of the cylindrical surface matched in radius to the curvature of the scanned energy. The optical scanning device is then precisely moved along precision made rails at a constant speed along the center axis of the drum. The photo-sensitive material that is guided or attached to the cylindrical surface is scanned (or exposed) by the light beams reflected by the rotating scan optic of the optical scanning device.

Cylindrical imaging systems are inherently simple since the curvature produced by the operation of the scanner is corrected by the curvature of the cylindrical locating surface. In addition, the duty cycle or scan efficiency can approach 100% if the fall 360 degrees of the cylindrical surface is utilized. Cylindrical imaging systems do, however, have very significant limitations. The surface to be scanned (or exposed to the light) must be flexible and the length of the surface is limited by the length of the drum. While it may be possible to make the cylindrical surface very large in radius and very long, as a practical matter, cost and accuracy factors become increasingly prohibitive if the radius and length of the cylindrical surface exceed 18" and 48", respectively. Generally, in order to take advantage of the inherent simplicity of the cylindrical imaging configuration, only one scan line can be produced per revolution of the scanner. Thus the scanner must rotate at a high rate of speed to achieve a high scan rate. At high rates of speed, problems with noise, windage and deflection of the optical surface are increasingly problematic.

The rotatable scan optic in the cylindrical imaging context typically consists of a single mirror, an assembly of more than one mirror, or a glass prism with one or two reflective surfaces. Generally one scan line per revolution of the scanner is produced, although Kramer, U.S. Pat. No. 4,786,126, teaches a design whereby two scan lines per revolution may be produced. The rotatable scan optic may be mounted on a spindle supported by ball bearings or by a fluid film bearing. A fluid film bearing utilizes a gas or oil to separate and lubricate sliding surfaces and may be externally pressurized or generate its own internal pressure, referred to as self-acting. Fluid film bearings are superior to ball bearings in terms of rotational accuracy, repeatability, and high rotational speeds.

The ideal cylindrical scanning system will be capable of a very high rate of scan, high resolution, and high scan efficiency while maintaining these qualities for large sizes of reproductive media. For example, see U.S. Pat. No. 5,610,751, to Sweeney et al., that teaches a self-acting gas bearing enclosed in a spherical windowed housing used to establish an accurate, high speed, low noise, lubrication-free, contamination protected, long living, scan motor and optical assembly. Self-acting gas bearings are preferred for high performance cylindrical imaging applications where exceptional accuracy, high rotational speeds, and low velocity jitter are required. Since cylindrical imaging systems utilize, as a general rule, one scan line per revolution, the accuracy and repeatability in the registration of adjacent scan lines is solely dependent on the accuracy and repeatability of the bearing and the motor velocity control system. The use of a gas film bearing provides an accurate platform that has become the predominant technology for cylindrical imaging systems.

To summarize, cylindrical imaging systems are inherently simple, but lack the general utility of flat field systems, since they must reconcile large cylindrical surfaces and flexible reproductive materials. As demonstrated above, it is also increasingly problematic to design and operate a single scan line per revolution scanner as the scan rate is increased, aperture size and resolution is increased, and imaging format size is increased.

In a typical flat field imaging application, a photo-sensitive material, for example, is moved at constant speed by a capstan roller or other linear conveyor means, fed from continuous rolls or precut cassettes of stacked material to present the material to a stationary optical system for scanning. Alternatively, stationary photo-sensitive material may be imaged by translating the optical system. Flat field systems have superior general utility over cylindrical imaging systems because the surface that is to be imaged onto or inspected is not required to be finite in length, need not be flexible and may thus be fed continuously at great speed. Imaging of stiff metal plate materials and inspection of electronic components require the use of flat field scanning systems.

The scan optic in the flat field imaging context typically consists of a resonating or rotating single facet mirror, or an assembly of two or more mirrors, or a glass prism consisting of one or two reflecting surfaces. It is also common to have a rotating polygon or hologon having multiple reflective or refractive facets symmetric to a central rotating axis.

Flat field systems require the use of additional conditioning optics to flatten the curvature produced by the rotation of the scanner as the beams are swept into an arc. This correction is commonly known as f-theta correction. F-theta curvature error can otherwise be corrected by imaging onto a cylindrical surface having a matched radius of curvature as discussed previously. F-theta curvature may also be corrected by refractive (lenses) or reflective (mirrors) means. F-theta conditioning optics for large format, high resolution applications, typically cannot perform adequately for angles of scan much greater than 22.5 degrees of scanner rotation (45 degrees of optical scan angle) out of a total of 360 degrees. This results in an effective scan efficiency of approximately 12% for a flat field, rotating, single facet scan optic that can produce only one scan line per revolution compared to up to 100% scan efficiency that can be achieved with the cylindrical approach. Alternatively, the duty cycle of a single facet resonant scanner is improved to 30–35% at the expense of large variations in scan velocity which must be corrected for in modulation of the laser beam. This loss of scan efficiency is a significant disadvantage since the rate at which the laser must be modulated and the instantaneous power of the laser must both be increased significantly compared to the cylindrical imaging case for a given rate of scan due to the dramatic reduction of scan efficiency. If a multi-facet device is used, such as a polygon or hologon, each facet can service the 22.5 degree acceptance angle of the f-theta optics thus the scan efficiency for a polygon or hologon scanner for flat field systems can be as high as 50–80% if 8–12 facets are used. However, the use of multiple scan surfaces on the scan optic to multiply the effective scan rate, as is the case for both the polygon or hologon scanners, produces undesirable side effects unique to these types of scanners. The use of a multi-faceted holographic rotating scanner has unique advantages with respect to cross-scan error and scan efficiency compared to a rotating polygon scanner. Its principal disadvantage is the requirement for a laser having refined wavelength stability. Such a device also cannot be used for alternative wavelengths without change of design and is completely unsuitable for simultaneous multiple color scanning.

Multi-facet scanners in general, and polygon scanning systems in particular, have inherent limitations in that corrections must be made for relative errors in the facets of the polygon that deflect laser energy to create a scanned line. As the object of scan is moved away from the scanner, as is the case for large imaging formats, and as the resolution is increased, very small errors in the facets of the polygon in relation to its rotating axis and variation in the rotating velocity can produce noticeable errors. These errors are commonly known as cross-scan and in-scan related errors.

It is known to use anamorphic correcting optics that can correct for cross-scan errors. These optics become increasingly difficult and expensive to design and manufacture as the size of the imaging format increases. Typically, the anamorphic cross-scan correction approach is cost and performance limited for scan widths greater than 14" and resolution greater than 2,000 dots per inch. Though it is known to use anamorphic correction with flat field system widths of as large as 26", the cost for such a system is prohibitive. An additional disadvantage of the anamorphic approach is that the use of multiple wavelengths of light, especially at the same time, is restricted.

A well known alternative to the anamorphic approach is the use of an active cross-scan correction approach that simplifies the optical design significantly by eliminating the need for anamorphic correction elements that would be very large and very expensive for large format operations and that restricts the goal for having a system that is polychromatic. Besides the cross-scan error, the in-scan error component is also of equal importance for both cylindrical and flat field imaging. For a rotating optic producing a single scan line per revolution, in-scan errors are solely attributable to the accuracy and repeatability of the rotating velocity. To a significant extent, the accuracy need not be as good as the repeatability. For imaging systems, small variations in velocity that repeat at the same place from one scan line to the next do not produce an error that is noticeable to the human eye. Multiple facet scanners such as the rotating polygon require more refined accuracy of velocity control as well as repeatability since each facet represents a fraction of the total rotation and the period of each fraction must be nearly identical. Otherwise in-scan related errors become readily visible.

In the use of a polygon scanner, whether passive or active means are used to correct for cross-scan error, the rotatable scan optic is commonly mounted on a shaft supported by a bearing assembly normally including radial and thrust support components. Fluid film bearings are used in scanners of all types where exceptional accuracy, high rotational speeds, and low velocity jitter are required.

It is essential to the present discussion, in view of the lack of common terminology within the optical scanning and precision instrument industry in general, to distinguish between non-repeating and repeating sources of error. Non-repeating or random errors are difficult to isolate and correct. Sources of non-repeating errors in the context of optical scanning devices are often caused by aerodynamic or windage effects on the rotating optic or errors in the bearing supporting the scan optic that defines the axis of rotation of the scanner.

Repeating errors recur in the form of periodic and predictable patterns and can generally be measured, and in many cases compensated for, using feedback error correction.

Within the flat field applications, it is well known that the rotating polygon scan optic has greater potential for speed and efficiency compared to the use of the resonating scanner or single facet rotary scanner. The polygon scan optic is superior because for each rotation thereof, a polygon scan optic having "n" number of facets produces "n" number of scan lines, whereas for the single facet rotary scan optic or resonating scanner, for each revolution of the scan optic, one scan line is produced. Thus, to obtain a high resolution image on a given imaging surface in as short amount of time as possible, it is desirable to maximize the scan rate of the scan optic. In addition to the rotating polygon scanner operating at a greater scan rate, it can use a larger aperture, and the reflecting surfaces of the polygon scan optic are less susceptible to distortion from centrifugal body forces by comparison to single facet, rotating or resonant scanners.

However, this potential of the polygon scan optic cannot be realized unless scanning errors unique to the polygon scanning device can be reconciled in the design of the overall scanning system. In this regard, it is important to note the image producing quality and productivity of a polygon optical scanning device depends largely on its precision and on the scan rate and scan efficiency of the device's polygon scan optic, respectively. Precision is necessary to achieve higher resolutions, and a higher scan rate and efficiency are necessary to generate the high resolution images faster.

One significant scanning error common to polygon scanning devices is "cross-scan" error. Cross-scan error specifically refers to errors in the placement of scan lines in a direction perpendicular to the lines being scanned. The polygon cross-scan error phenomena is the result of one or more of three separate sources of error. The first source of error is the accuracy of the rotating axis of the motor-driven bearing assembly on which the polygon is mounted or integral to. This type of error is generally non-repeating in nature. The second source of error is the parallelism of the true rotating axis of the spindle and the virtual axis of the polygon. This type of error is generally repeating in nature. The virtual axis is defined as that axis best fitted to the relative angles of each of the polygon facets. The third source of error is the relative angle errors of each facet to the defined best-fit virtual axis. This error is also repeating in nature. All of these errors sum together resulting in composite cross-scan error.

Because of the above noted superior advantages of flat field scanning compared to cylindrical scanning, it has been the subject of many efforts in the prior art to develop polygon scan optic systems with various error correction schemes. For example, U.S. Pat. No. 5,365,364, to Taylor, discloses and teaches the design of an all reflective flat field imaging system with multiple facets, having high scan efficiency, suited for use at numerous operating wavelengths of light enabled by the all reflective design. The Taylor device is taught as being aerodynamically smooth to reduce bearing perturbation due to windage and, accordingly, it has a potential for improved scan rate enabled by improved scan efficiency.

U.S. Pat. No. 5,281,812, to Lee et al., discloses and teaches a flat field imaging system with an f-theta lens that utilizes a closed loop control system to correct for the repeating and non-repeating cross-scan errors of a polygon scanner in real time by implementation of a novel piezoelectric driven mirror. Lee et al. teach the limitation of single faceted scanners in the flat field context, the problems with acousto-optic modulators to influence cross-scan correction, and the cost and implementation limitations of the use of anamorphic cross-scan correction optics. Lee et al. also teach the fundamental limitations of the natural frequency of the spring-mass system embodied in the implementation of a mirror driven at high frequency by piezoelectric actuators.

U.S. Pat. No. 5,247,174, to Berman, discloses and teaches a flat field imaging system having an f-theta lens that utilizes a closed loop control system to correct for the repeating and non-repeating cross-scan errors of the polygon scanner in real time by attaching the end of a fiber optic coupled to a gas laser onto a piezoelectric actuator and correcting the errors of the polygon scanner by moving the laser beam source.

U.S. Pat. No. 4,441,126, to Greenig et al., discloses and teaches a beam deflection system having an acousto-optic modulator connected to a lens located between the laser and the polygon scan optic. The Greenig et al. reference discloses a sensor and bridge circuit to sense the position of the beam scan and error value for each facet of the scan optic. The values are averaged and a correcting signal and voltage adjustment are supplied to adjust the balance of the bridge to drive the average value toward a reference value.

U.S. Pat. No. 4,054,360, to Oosaka et al., discloses and teaches an improved method and apparatus for removing scanning error associated with the lack of perfect parallelism in a rotating polyhedral mirror. Oosaka et al. teach the use of an incident beam directed along a vertically independent optical patch and brought back into incidence on the same mirror deflection point to eliminate the error in parallelism without interfering with the horizontal scanning of the reflected beam.

The examples of prior art mentioned above focus on reduction of scanning errors in polygon scanning systems by utilizing active and passive means to reduce the repeating errors, but fail to disclose, teach or suggest the use of a fluid film bearing for rotating the polygon scan optic to reduce the non-repeating errors. The accuracy of these systems are limited by the accuracy of the bearing system which typically induces significant non-repeating errors. Alternatively, if a fluid film bearing, or more specifically, a self-acting gas bearing is utilized to reduce non-repeating errors in conjunction with active or passive means to correct for repeating errors, then a significant reduction of composite errors is realized and system accuracy improved.

Moreover, the inherent accuracy and repeatability afforded by a fluid film bearing also enables the use of an open loop control system for active correction of repeatable scanning errors. Open loop correction techniques are not practical for polygon scanning applications unless the non-repeating component of the system errors is reduced to negligible levels.

Active and passive error correction techniques are well known in the art. Active cross-scan correction implies that the errors are continuously tracked or mapped in the operation of the system and some sort of mechanism within the design continuously implements an equal and opposite error to that of the composite error of the rotating polygon sub-system. Prior art techniques include the use of an acousto-optic modulator in the path between the laser source and the rotating polygon. The acousto-optic modulator can be used to re-direct the beam at precisely the opposite angle that each polygon facet requires to achieve negligible cross-scan error. An alternative approach that has been used is to tilt a mirror in the system by use of a device such as a piezoelectric actuator or voice coil type of actuator. Piezoelectric actuators, voice coil actuators, and many other types of actuators of similar vein are broadly classified as electromechanical actuators.

A second undesirable source of error in optical scanning systems results from "in-scan" error. In-scan error specifically refers to errors in the placement of scan lines in a direction parallel to the lines themselves. In-scan error can also cause cross-scan errors since velocity variations of the polygon scan optic result in placement errors on the scanned media. Like cross-scan error, in-scan error is also the result of several components both repeatable and non-repeatable. The first source of in-scan error is related to the accuracy of the rotating axis of the bearing. If the rotating axis of the bearing is not perfectly aligned with the rotating axis of the polygon scan optic, there will be some repeatable error. The second error is the relative height of each of the polygon facets to the axis of rotation of the bearing. If the bearing has a nearly perfect axis of rotation, as is the case for a fluid film bearing, facet height errors are isolated to the manufacture of the polygon and its registration to the bearing axis. Facet height errors result in length variations from one scanned line to the next. The error pattern is repeatable with each fall rotation of the polygon. Facet height errors can be reduced to negligible levels by controlled manufacturing processes applied to the manufacture of the polygon. This error may also be corrected by inducing small variations in the rotating velocity of the scanner.

The third error affecting in-scan error relates to the accuracy of the speed control feedback control system that governs the rotational velocity of the polygon. The in-scan error problem for the polygon scanning system is most significant for high resolution, flat field imaging systems. This is because the distance from the polygon to the reproductive media tends to be large and incremental velocity errors less than 1/1,000,000 of a revolution of the scanner can produce noticeable in-scan related artifacts. Single facet scanning systems can tolerate much greater velocity variation so long as the velocity profile repeats from one revolution of the scanner to the next. As an example, typical single facet, air bearing, rotary scanners have incremental velocity errors on the order of 5–10 parts per million/revolution (PPM/rev) but repeat at any point of interest in the scan to a precision of less than 1.0 PPM/rev. Since the polygon scanner generates a multiplicity of scan lines per revolution, incremental velocity variation cannot be tolerated.

It is important to distinguish between "short-term" and "long-term" errors. Short-term errors are defined herein as errors that appear within fractions of a revolution up to several thousand revolutions of the rotating scanner. Long-term errors are defined as errors that occur over more than several thousand revolutions of the rotating scanner, or otherwise defined over a significant period of time or number of scan lines. Short-term and long-term errors can both be repeating and non-repeating in form. Very small short-term errors are known to produce imaging anomalies such as "banding". In general, larger errors spread over longer periods of time can be tolerated. Actual tolerances depend on many factors unique to a particular imaging application including error spacial frequency, image contrast, and overall image distortion.

In summation, the prior art has yet to disclose or teach singularly, or in any combination, and there continues to be a significant need for, a large format, flat field, high resolution, high speed optical scanning system, at a cost that makes such a device practical and usable in a significant number of applications. More particularly, the prior art is lacking and there remains a need for a flat field scanning system that utilizes a polygon scanner with a fluid film bearing to reduce non-repeating scanning errors, and has an open loop control system for active correction of repeatable scanning errors, and is capable of producing large formats at high resolution and high scan rates.

SUMMARY OF THE INVENTION

The objective of the disclosed invention is to present a flat field imaging approach that can match the resolution of current cylindrical imaging systems, match the format sizes of such systems, surpass the scan rate possible with such systems, while realizing the superior utility of a flat field system over the cylindrical imaging approach. The present invention resides in a flat field optical polygon scanning device specifically developed for large format, high scan rate, high resolution, monochromatic and polychromatic flat field scanning for imaging and inspection purposes.

In particular, the present invention relates to a polychromatic polygon scanning system having a rotating polygon scan optic, a fluid film bearing rotatably supporting the rotating polygon scan optic, and scan error correction. More specifically, the fluid film bearing is a self-acting gas bearing having exceptionally low non-repeating error. The scanner of the present invention further includes a chamber fitted with a window, for reducing non-repeatable errors induced by windage from the rotating polygon scan optic, a phase lock loop control system premised on the use of the fluid film bearing with low velocity jitter, a reflective multi-spectral f-theta correction scheme, a solid-state laser light source, and a cross-scan correction mechanism to displace position of the laser diode to influence the angle of the laser beam as it addresses each facet of the polygon. The cross-scan correction mechanism has a high natural frequency and very small inertia so that the device can be operated at exceptionally high speeds to actively correct for the repeating cross-scan errors identified in the scanning system under consideration.

The present invention also relates to a method for identifying and correcting the repeatable errors in a polygon scanning system having a fluid film bearing for the rotating polygon scan optic.

The disclosed invention results from the systematic reduction of sources of non-repeating, short-term error. Once the sources of short-term, non-repeating error are minimized, short-term repeating errors can be measured, isolated and reduced by several methods. The short-term repeating errors are separated into "cross-scan" and "in-scan" components.

By use of a fluid film bearing in general and a self-acting gas bearing in particular, aerodynamic streamling of the polygon scan optic, and a windowed enclosure surrounding the rotating polygon scan optic to minimize windage induced errors, the non-repeating component of the cross-scan error can be virtually eliminated leaving only the repeatable component. The repeatable component can then be measured, isolated and reduced by active correction using a cross-scan correction mechanism and an open loop control system.

In the context of the use of polygon scanners for generating scan lines onto reproductive media, repeatable and non-repeatable cross-scan errors manifest reduction in the image resolution that is directly proportional to the magnitude of the composite error. If the accuracy of the bearing is the least significant error, as is the case for a fluid film bearing, and air turbulence effects are minimized, a repeatable cross-scan error pattern known as "banding" will be produced. Since the banding phenomena is highly undesirable, and since it is highly repeatable with every period of rotation of the scanner, the present invention measures and corrects cross-scan errors to eliminate banding.

To successfully implement an active cross-scan correction system for polygon scanners using electro-mechanical motive devices such as piezoelectric or voice coil actuators, or electro-optical devices that influence apparent movement of the laser source, the present invention uses a self-acting gas bearing to ensure rotational axis repeatability and minimize non-repeating errors.

As with the cross-scan error component, the non-repeating error component of the in-scan error is made negligible by using a polygon scanner having a fluid film bearing in general and a self-acting gas bearing in particular, aerodynamic streamlining of the polygon scan optic, and a windowed enclosure surrounding the rotating polygon scan optic to minimize windage induced errors. In addition, an optical encoder is provided on the rotating shaft of the self-acting gas bearing to generate a highly repeatable shaft rotation reference. The low friction, high precision of the self-acting gas bearing, combined with the repeatable optical encoder, provides the unique capability of outstanding velocity control in the polygon scanner of the present invention.

Like with the cross-scan error component, the essential issue for correcting the in-scan error is that the non-repeatable component of the in-scan error is virtually eliminated leaving only the repeatable component, which can be measured, isolated and reduced by active correction, in this case, using the outstanding velocity control of the polygon scanner.

The most basic approach to reconciling in-scan errors is the design and manufacture of the bearing, polygon scan optic and velocity control system to such a degree that residual in-scan errors will have negligible effects on images created. The present invention makes it possible to uncouple the performance of the polygon imaging subsystem from the electronics control system for modulating the laser subsystem. This approach makes possible the design and production of the polygon imaging subsystem as a stand-alone product capable of interfacing with a wide variety of application platforms. Thus, the rotational velocity of the polygon scanner is controlled to sufficient precision to eliminate in-scan related artifacts or the need to actively synchronize the modulation of the laser with rotation of the scanner.

The fluid film bearing, or more particularly a self-acting gas bearing, for the polygon scanning subsystem, the use of the active cross-scan correction technique to correct for repeating relative tilt errors in the polygon facet, and the use of a feedback control system premised on the repeatable encoder enabled by the use of the fluid film bearing offers great freedom to the design of the post scan conditioning optics. In effect, the design of the post scan conditioning optics are designed as if a perfect rotating polygon were in use. As previously discussed, for the context of flat field imaging, f-theta corrective optics are used to flatten the curvature of the reflected scanned imaging field. The present invention allows the use of reflective f-theta optics to provide a design that results in a nearly universal flat field line imager that can be uncoupled from the laser modulation and can be operated over a broad range of laser wavelengths without chromatic dispersion. Besides more universal use for a broad range of single wavelength applications, the disclosed system is well suited for full color simultaneous imaging. The disclosed invention also readily accommodates the use of refractive f-theta optics as well.

Piezoelectric actuators and other beam deflection technologies such as those based on the electro-optic principle are available at reasonable cost to influence correction of polygon cross-scan errors. The essential feature of the disclosed invention is to reduce the non-repeating errors to such a degree that the repeating residual error may be accurately measured and then corrected.

The electronics of the present invention for correcting the cross-scan and in-scan errors are relatively simple, readily available and, therefore, relatively low in cost. The present invention also uses a rotational velocity control subsystem that is relatively low cost and is particularly well suited for use with the self-acting gas bearing of the present invention combined with a relatively low cost optical encoder.

The disclosed invention is simple, is adaptable to large apertures, is well suited to imaging or inspection of flat widths greater than 14" and infinite in length, is capable of scan rates greater than 1,000 Hz, is capable of resolutions greater than 1,000 dpi, is uncoupled from the laser modulation to produce near identical scan lines from one facet to the next, and, because of its reflective design, is well-suited for color imaging. In view of the above, many objects and advantages are achieved by the present invention.

It is an object of the present invention to minimize the influences of non-repeating short-term errors by use of a fluid film bearing, more specifically, a self-acting gas bearing in combination with aerodynamic streamlining and the use of a windowed chamber to further minimize non-repeating perturbations due to windage.

It is a further object of the present invention to identify the residual repeating error and non-repeating error components of the polygon scan optic and minimize the non-repeating error to a negligible amount.

It is another object of the present invention to provide a polygon scanner having a means for correcting repeating residual error components of cross-scan and in-scan errors associated with the operation of the rotating polygon scanning system.

It is a further object of the present invention to provide a polygon scanner having a precise rotating axis which is controlled by an electronic control system to separately influence the repeating in-scan and cross-scan error components.

It is a further object of the present invention to provide a polygon scanner according to the present invention having the in-scan error minimized by the use of a velocity feedback control system that depends on the repeatability of an optical encoder operating on the rotating axis of the self-acting air bearing spindle.

It is another object of the present invention to provide a polygon scanner having a cross-scan error that is minimized by the high speed displacement of a diode laser by a piezoelectric actuator or tilt of a mirror to influence a virtual displacement of the diode laser, actuated by information from a repeatable error profile stored in memory, and the real or virtual displacement of the diode laser causes an angular shift of the beam that is equal and opposite to the error on each facet of the polygon scan optic. For use of a gas laser or in the use of simultaneous color imaging, the preferred embodiment will be a mirror tilted by the use of a piezoelectric actuator. For the use of a single wavelength application that uses a laser diode, the preferred embodiment is to mount the laser diode directly to the piezoelectric actuator. For the use of a gas laser or for the use of simultaneous introduction of multiple laser colors, the use of a piezoelectric tilted mirror is the preferred embodiment. An electro-optic device may also satisfy the conditions for any of the above laser implementation scenarios.

It is a further object of the present invention to provide a polygon scanning system having a cross-scan error profile that is continuously corrected by synchronizing the high speed displacement of a diode laser, by means of a piezoelectric actuator, in a direction opposite an amount equal to the repeatable error for a particular facet of the polygon scan optic.

It is further the object of the present invention to provide an optional self-calibration system that periodically senses small repeating errors caused by long-term drift, creates an electronic map of the repeating errors, electronically corrects for the repeating errors, provides the means to correct for long-term drift, and therefore periodically self-calibrates the factory measured polygon error profile. Because of the use of the self-acting gas bearing, the correction can be made solely by influencing the phase and amplitude of a sinusoidal component that is summed into the correction map established at the factory. Because of the exceptional short term repeatability of the self-acting gas bearing, sinusoidal phase and amplitude correction need not be introduced at a high update rate.

It is a further object of the present invention to provide a velocity control system that operates exclusive of the cross-scan correction system. As a direct consequence of the use of a gas bearing and other means to reduce non-repeating errors to a negligible level a repeatable composite error profile, as constructed by measurement of the period of each scan, may be recorded. An inverse error may then be summed into the phase-locked velocity control system to substantially correct the in-scan error.

It is yet another object of the present invention to provide a large format, high scan rate, high resolution, flat field imaging, polygon scanning system having reflective f-theta correction optics, that utilizes a polygon scan optic rotatably supported by a fluid film bearing and active correction.

It is a further object of the present invention to provide a rotating polygon scan optic having a self-acting gas bearing, a windowed enclosure surrounding the rotating polygon scan optic, and an active error correction system for realizing exceptionally high scan rates compared to resonant scanners and single facet scanners while also yielding a greater scan efficiency.

It is yet another object of the present invention to achieve the above mentioned objects in a device that can be manufactured at a relatively reasonable cost that was not previously possible.

It is yet another object of the present invention to provide a scanning system that is modular in design and interactions with a means for conveying the object to be scanned and computerized means to modulate the laser element itself such that the general utility of the subject invention is optimized as a stand-alone product to service many different customers in various industries.

These and other objects of the present invention will become apparent from the following detailed description of the preferred embodiment taken in conjunction with the attached drawings that are briefly described as follows.

DETAILED DESCRIPTION OF THE PREFERRED EMBODIMENT

Figure 1:
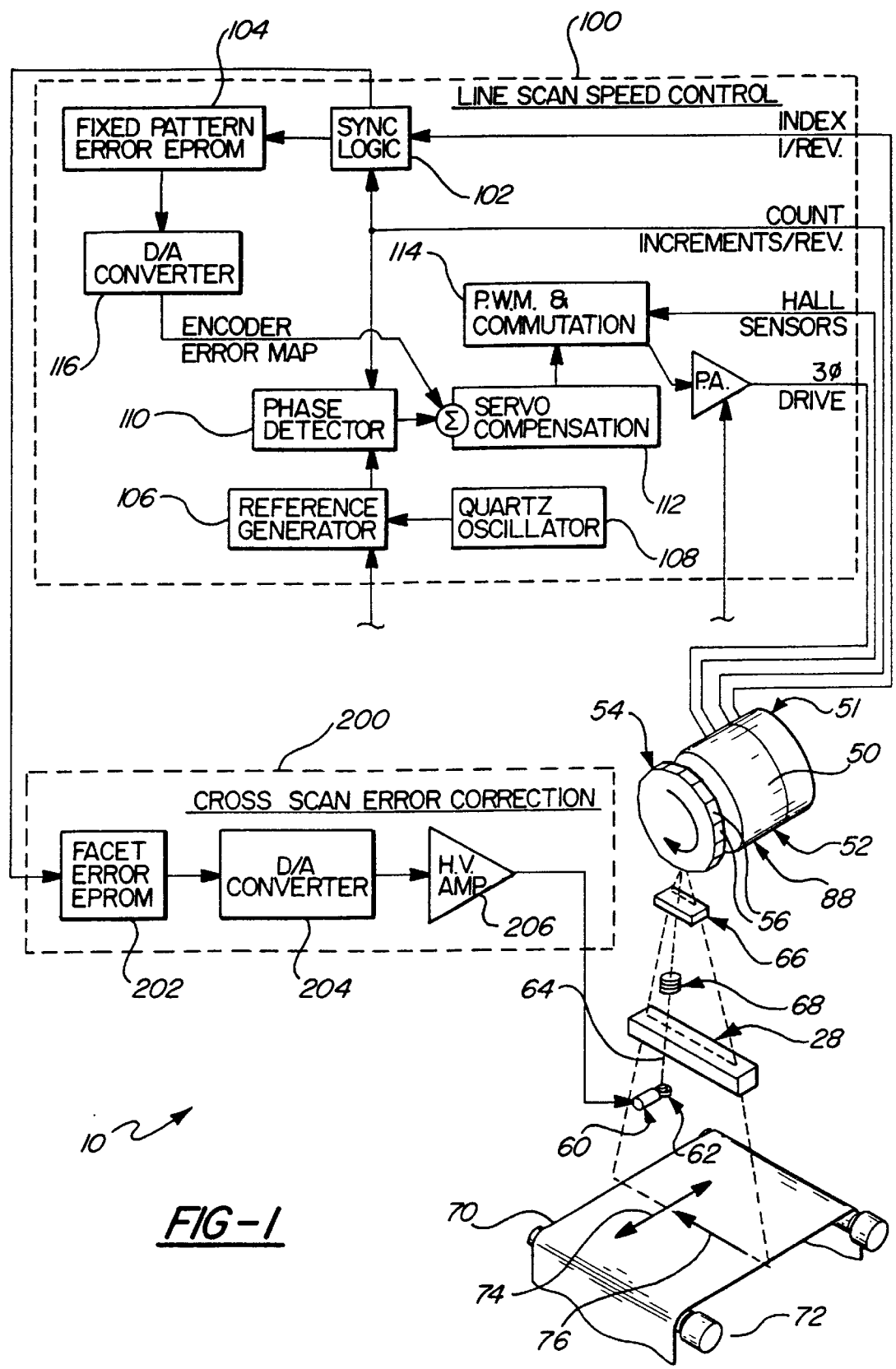
FIG. 1 is a perspective schematic view of a flat field open loop polygon scanning system of the first embodiment.

Referring to FIG. 1 there is shown an open loop flat field polygon scanning system 10. The open loop flat field polygon scanning system includes a rotating polygon optic device 50 having a fluid film (self-acting gas) bearing 88. The scanning system 10 includes a line scan speed control 100, phase locked to the outputs of an optical encoder 51 attached to and precisely aligned to the spin axis of the polygon optic device 50 and generates an output controlling the rotational speed of an electric motor 52 and a multi-facet polygon mirror or scan optic 54. The polygon mirror 54 has a plurality of facets 56 arranged about its periphery. The polygon scanning system 10 also includes an open loop cross-scan error correction subsystem 200 responsive to scan position data output from sync logic circuitry 102 generates an output signal actuating a piezoelectric actuator 60.

A laser diode 62 attached to the piezoelectric actuator 60 generates a laser light beam 64 that is directed towards the rotating polygon scan optic 54 through a window 66. The laser diode 62 is translated by the piezoelectric actuator 60 to correct for repeatable angle errors in the polygon optic device 50. Laser conditioning optics 68 are disposed between the laser diode 62 and the rotating polygon scan optic 54. The laser light beam reflected from a facet 56 of the rotating multi-facet polygon scan optic 54 is directed to the media 70 to be scanned.

A linear transport mechanism 72 transports the media 70 in a direction indicated by arrow 74 normal to the scan direction of the laser light beam indicated by arrow 76. Refractive or reflective correcting optics 28 are disposed between the polygon scan optic 54 and the media 70 being scanned.

The line scan speed control 100 consists of sync logic circuitry 102 that receives an index signal (one per revolution) and count signal (increments/revolution) from the optical encoder 51 and generates a scan position signal. The scan position signal is used to synchronize the in-scan and the cross-scan error correction subsystem 200 with the rotational position of the rotating polygon scan optic 54. In this way the in-scan and cross-scan errors are mapped to the corresponding facet of the polygon scan optic 54. A second output of the sync logic circuitry 102 is received by a fixed pattern error EPROM 104 that stores the residual in-scan velocity error that is used as a correction factor to minimize the actual beam velocity errors at the image plane. The fixed pattern error EPROM stores information of the residual in-scan errors due to the encoder disk run-out and facet height variations of the multi-facet polygon scan optic.

A reference generator 106 provides the necessary frequency reference to a phase detector 110 by dividing down the output frequency of a quartz oscillator 108. Speed selection of the polygon scan optic 54 is performed by operator selection of a division factor needed to generate the appropriate reference frequency for each speed. The output of the reference generator 106 must be stable and virtually jitter free. The phase detector 110 receives the sync signal from the sync logic circuitry 102 and the count signal from the optical encoder 51 and outputs an analog error voltage that is summed with the output of the fixed pattern error EPROM 104 in a servo compensation circuit 112. A digital to analog (D/A) converter 116 converts the digital output of the fixed pattern error EPROM 104 to an analog signal prior to being summed with the output from the phase detector 110. The servo compensation circuit 112 provides the necessary gain needed to close the velocity phase loop and maintain system stability. A PID control loop is implemented at this point forming a type II control system that maintains a tight control over the rotational rate of the polygon scan optic 54. The motor speed is controlled by a Pulse Width Modulator (PWM) and commutation circuit 114 in response to the output from the servo compensation circuit 112. While a standard three phase brushless DC motor 52 is the preferred embodiment, and is represented in FIG. 1, any suitable motor type and electronic drive circuitry may be used, such as a hysteresis synchronous or permanent magnet brush type DC motor.

The cross-scan error correction subsystem 200 consists of a facet error EPROM 202 storing cross-scan error correction information for each facet 56. The facet error EPROM 202 is addressed by the scan position data received from the sync logic circuit 102 and outputs cross-scan error correction data The cross-scan error correction data is applied to the piezoelectric actuator 60 through a digital to analog (D/A) converter 204 and a high voltage amplifier 206. The piezoelectric actuator 60 converts the output of the high voltage amplifier 206 into a mechanical displacement, modulating the position of the laser diode 62 in a way so as to cancel the polygon angle errors.

Prior to use, the polygon scanning system 10 is calibrated to define the repeatable in-scan and cross-scan errors that are stored in the fixed pattern error EPROM 104 and the facet error EPROM 202, respectively. FIGS. 7–10 illustrate the means by which these errors may be measured and verified.

After calibration, the operation of the flat field polygon scanning system 10 is as follows:

The polygon optic device 50 is actuated and the multifacet polygon scan optic 54 is rotated at the desired speed under the control of the line scan speed control 100. Each facet 56 of the polygon scan optic 54, one at a time, will reflect the light beam generated by the laser diode 62 to scan the media 70 on the linear transport mechanism 72 in a direction indicated by arrow 76 normal to the direction of motion of the media indicated by arrow 76. The correction for fixed pattern errors from the fixed pattern error EPROM 104 is addressed by the scan position data output from the sync logic circuitry 102 and is applied to the servo compensation circuit 112 to correct for in-scan fixed pattern errors. In a like manner, the facet error EPROM 202 is addressed by the scan position data output of the sync logic circuitry 102 and is applied to the piezoelectric actuator 60 to displace the laser diode 62 correcting for cross-scan errors in the scanning of the media.

Figure 2:
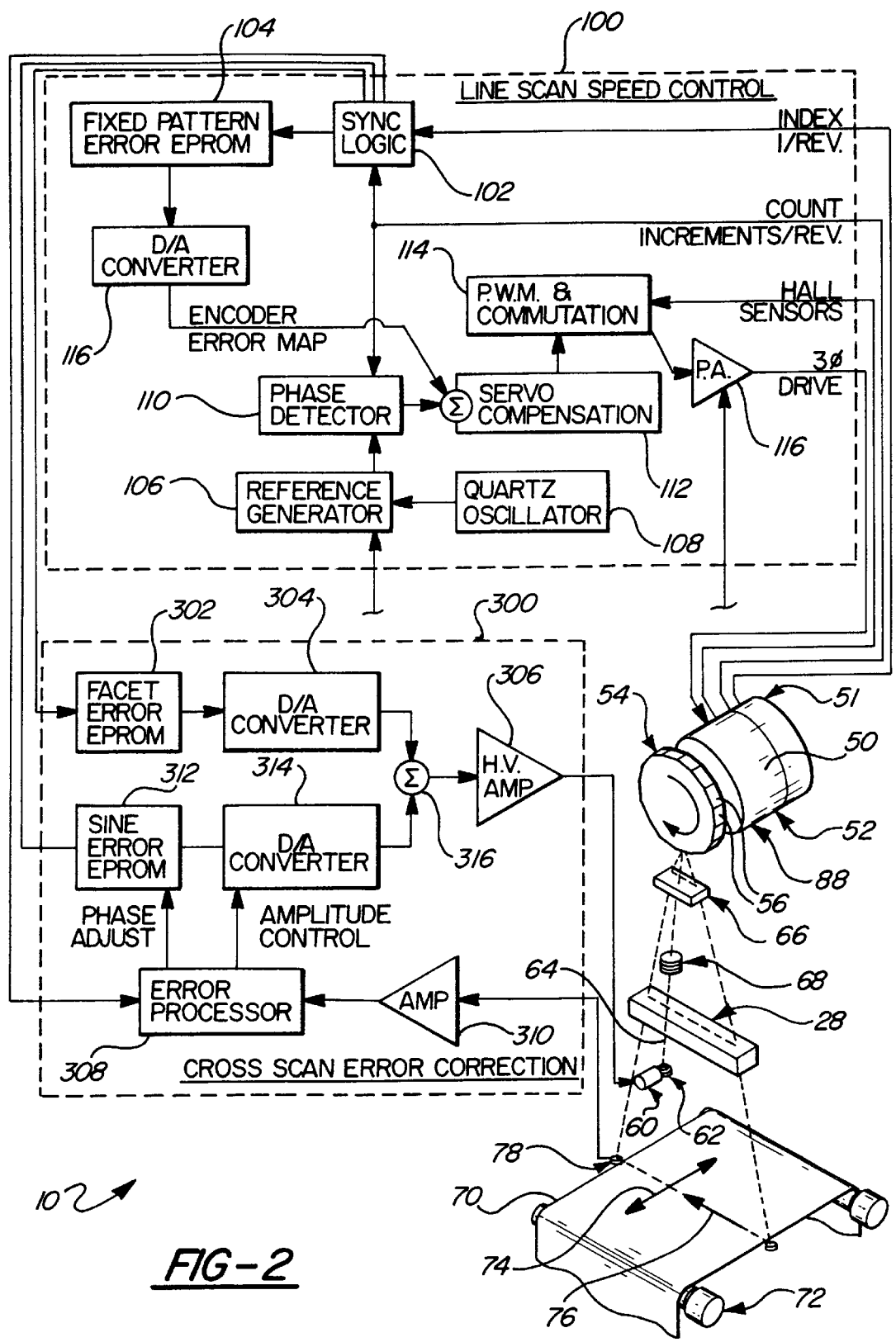
FIG. 2 is a perspective schematic view of a flat field polygon scanning system with optional self-calibration for correcting long-term drift.

Referring to FIG. 2 there is shown an optional self-calibration embodiment of the flat field scanning system. In this embodiment the polygon optic device 50, the piezoelectric actuator 60, the laser diode 62, laser conditioning optics 68, the refractive or reflective correcting optics 28, the media 70, the linear transport mechanism 72, and the line scan speed control 100, are the same as discussed relative to FIG. 1. The cross-scan error correction subsystem 300 differs from that shown in FIG. 1. In the self-calibrated embodiment, the linear transport mechanism 72 includes a cross-scan error detector 78 that provides periodic, long-term cross-scan error information to a cross-scan error processor 308 through an amplifier 310. The cross-scan error processor 308 also receives scan position data from the sync logic circuitry 102 and contains a correction algorithm necessary to implement a cross-scan correction update scheme. The outputs from the cross-scan error processor 308 drive a sine-error EPROM 312 that also receives scan position data from the sync logic circuitry 102. The sine-error EPROM 312 contains a sine function that is mapped over a 360 degree range. The phase and amplitude of the sine function is independently adjustable and is controlled by the scan error processor 308.

A facet error EPROM 302 and a digital-to-analog converter 304 are substantially the same as the facet error EPROM 202 and analog-to-digital converter 204 discussed relative to FIG. 1. The output of the sine-error EPROM 312 is converted to an analog signal by the digital-to-analog converter 314 and summed by a summing circuit 316 with the output of the digital-to-analog converter 304. The amplified signal is then applied to the piezoelectric actuator 60 through a high voltage amplifier 306. The amplitude of the output of the digital-to-analog converter 314 is controlled by the scan error processor 308.

Figure 3:
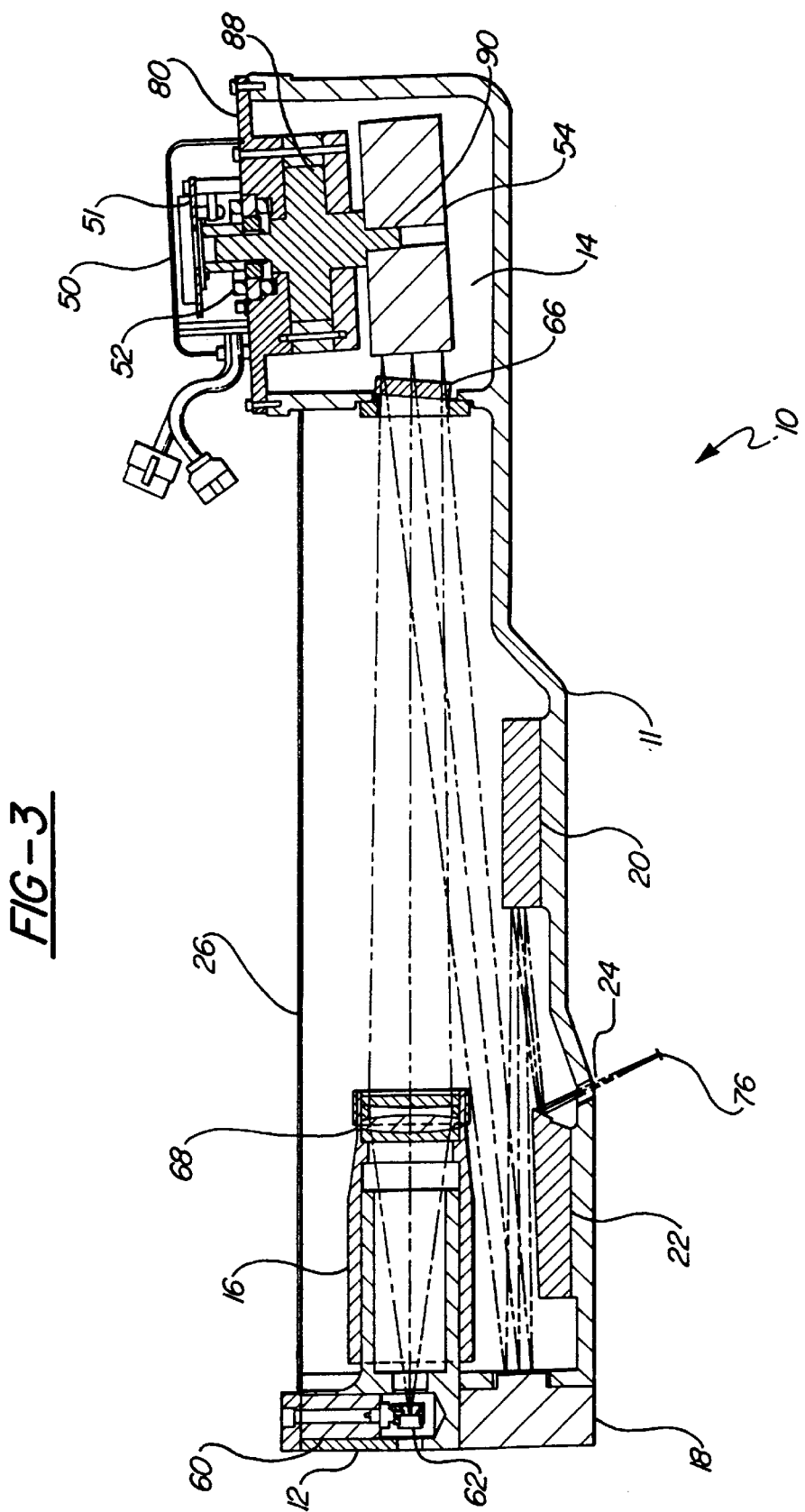
FIG. 3 is a section view of a first embodiment of the flat field polygon scanning system.

Referring to FIG. 3 there is shown a first embodiment of of the flat field polygon scanning system 10. The scanning system consists of a housing 11 partially enclosing the laser conditioning optics 68, the polygon optic device 50 and the correction optics 28. The piezoelectric actuator 60 and the laser diode 62 are mounted in a laser support 12 attached at one end of the housing 11, and the polygon optic device 50 is mounted at the opposite end of the housing 11 within a separate chamber 14 to reduce the influence of windage. The laser conditioning optics 68 are attached to a support cylinder 16 extending from the laser support 12 into the housing 11. A f-theta correcting mirror 20 corrects for f-theta field curvature and directs the converging laser light to the designed flat field line image indicated at 76. Laser light is emitted by the laser diode 62 that then encounters the laser conditioning optics 68 that direct the laser light to the rotating polygon scan optic 54 through the window 66. The laser diode 62 is modulated by a separate electronic control system that is not part of the disclosed invention. The laser conditioning optics 68 expand, collimate, and focus the laser light for presentation to the facets of the rotating polygon scan optic 54. The axis of the rotating polygon scan optic 54 is tilted so that each facet of the polygon scan optic encounters the conditioned laser light beam and directs the light to a post-scan flat mirror 18 attached to the housing 11 where it is reflected to a f-theta correcting mirror 20 that serves to flatten the curvature of the laser beam as it expands to the desired scan line width at the media 70. The light reflected from the f-theta correcting mirror 20 is directed to a second flat mirror 22 mounted within the housing 11 from which it is reflected to the media through an aperture 24 provided in the housing 11. A dust cover 26 encloses the housing 11 and limits ingress of dust and other contaminants into the optical cavity.

Successive adjoining facets of the rotating polygon scan optic 54 similarly encountering the conditioned laser light emitted by the laser diode 62 will cause the light to be sequentially scanned across the media 70. Each facet will have repeatable errors relative to each other and the true rotational axis of the rotating polygon scan optic 54. The piezoelectric actuator 60 with the laser diode 62 attached will move the laser diode in a linear fashion such that the trajectory of the light emerging from the conditioning optics 68 are scanned parallel to each other.

The polygon optic device 50 has a support member 80 fixedly attached to the housing 11 within the separate chamber 14. The self-acting gas bearing 88 has a rotatable spindle 90 on which is attached the rotating polygon scan optic 54, the electric motor 52, and an optical encoder 51. The optical encoder has a high density count track and index track to provide precise information of the rotation rate of the spindle as well as its precise angular position. The count track and index track information provided by the encoder is highly repeatable since the encoder is mounted directly to the spindle 90 of the self-acting gas bearing 88. Repeatable errors in rotation rate and angular position resulting from errors in the encoder are corrected by the same means that other repeatable errors in the polygon scanning system are corrected.

Figure 4:
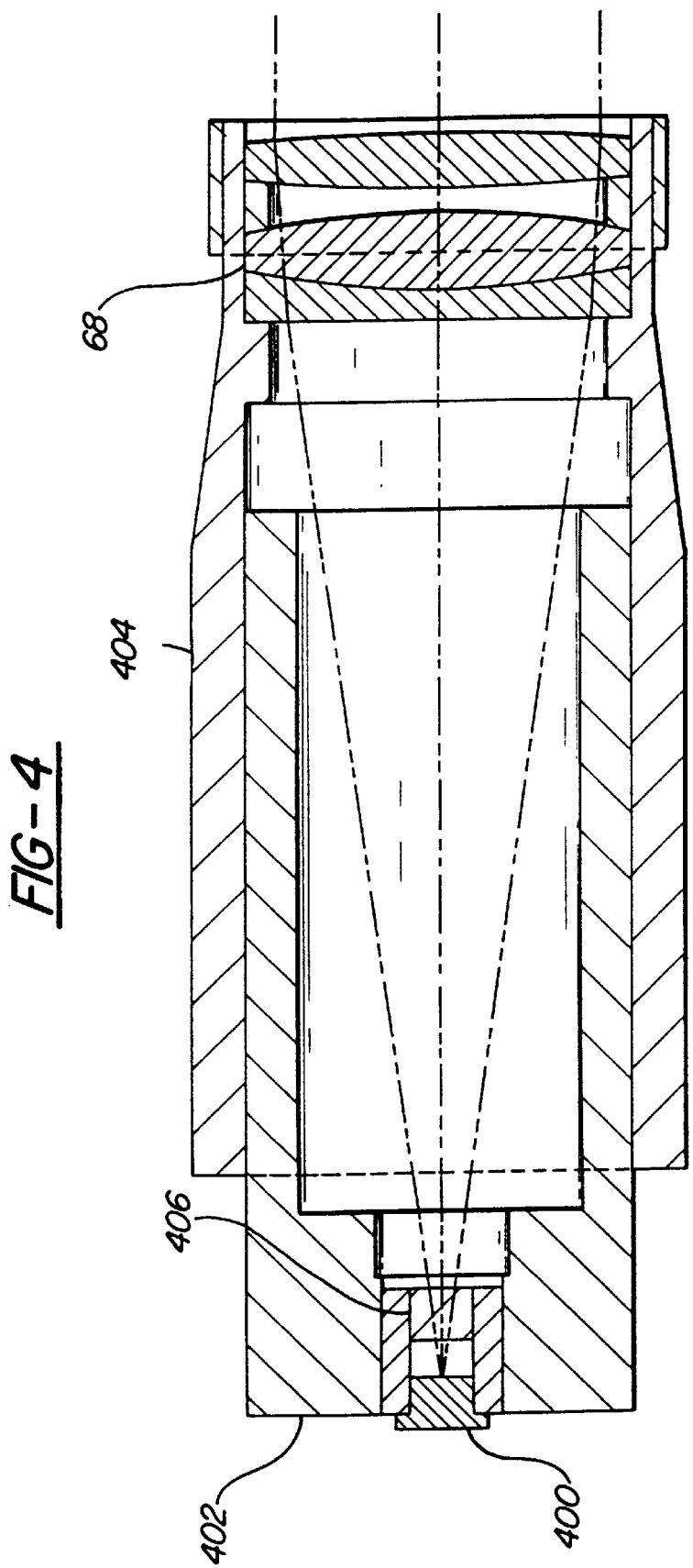
FIG. 4 is a cross sectional view of an alternate embodiment of a stationary laser diode and an electro-optic device.

FIG. 4 shows an alternate embodiment for displacing the light beam emitted by a source of laser light. In this arrangement the laser light source 400 may be a laser diode or any other type of laser light source such as a gas laser. The laser light source 400 is fixedly supported in a support structure 402 attachable to the housing 11. The laser conditioning optics 68 are attached to a cylindrical extension 404 of the support structure 402 that extends into the housing 11 as described relative to FIG. 3. An electro-optic beam deflection device 406 is disposed intermediate the laser light source 400 and the laser conditioning optics 68. The electro-optic beam deflection device 406 may be of any type known in the art that functionally acts in the same way as the physical displacement of the light source relative to the optical axis of the laser conditioning optics 68.

Figure 5:
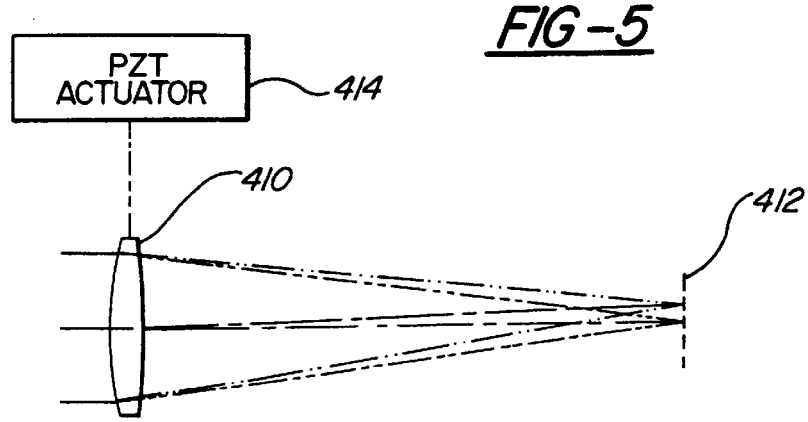
FIG. 5 is an optical schematic of a laser light service using a collimated stationary light source.

FIG. 5 depicts another arrangement for displacing the light beam emitted by a source of laser light. It is possible to implement the cross-scan correction by having a fixed laser source and using one or more lenses mounted to a piezoelectric actuator. A collimated (infinite conjugate) beam entering the lens (or lenses) 410 will be focused at an image plane 412. A piezoelectric actuator 414 will then shift the lens resulting in direct translation of the focused beam having the same displacement of that of the lens 410 as illustrated in FIG. 5. The diverging energy from the displaced focal point is collected by the laser conditioning optics 68 resulting in an angular shift in the beam when presented to the facets 56 of the rotating polygon scan optic 54 thus having the potential of correcting the cross-scan error as previously discussed.

Figure 6:
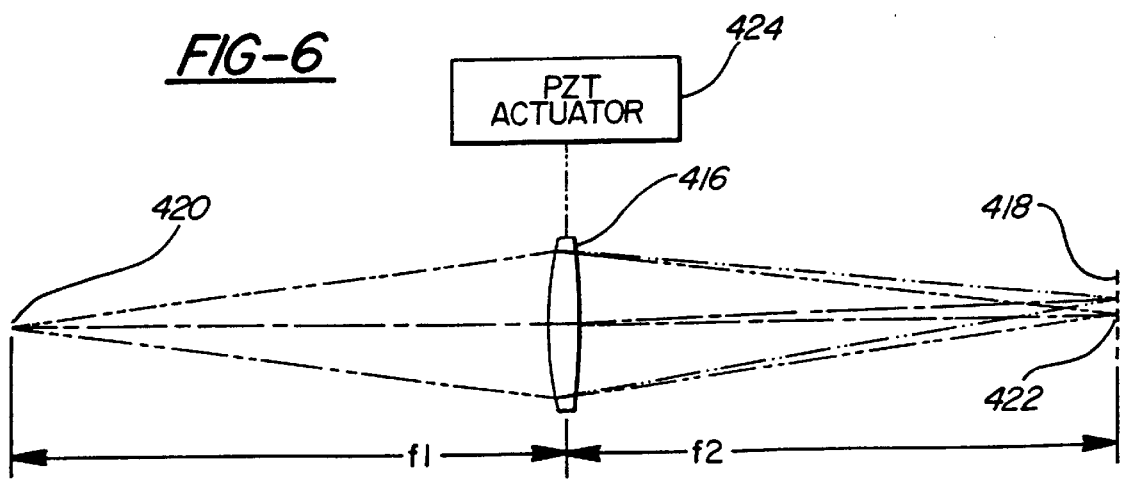
FIG. 6 is an optical schematic of a laser light source using a diverging stationary light source.

FIG. 6 depicts yet another possible arrangement for displacing the light beam emitted by a source of laser light. A fixed focus (focal point) 420 is presented at one finite conjugate of a lens (or lenses) 416, encounters the lens, and is focused at the other side of the lens at an image plane 418. The translation of the lens 416 by a piezoelectric actuator 424 again results in translation of the focused light beam, and in combination with further beam conditioning optics, results in an angular shift of the beam presented to the facets 56 of the rotating polygon scan optic 54. The use of the lens (or lenses) 416 with two finite conjugate focal points 420 and 422 offers the ability to increase the magnification of the translation of the relayed focal point in accordance with the equation (f1+f2)/f1.

Figure 7:
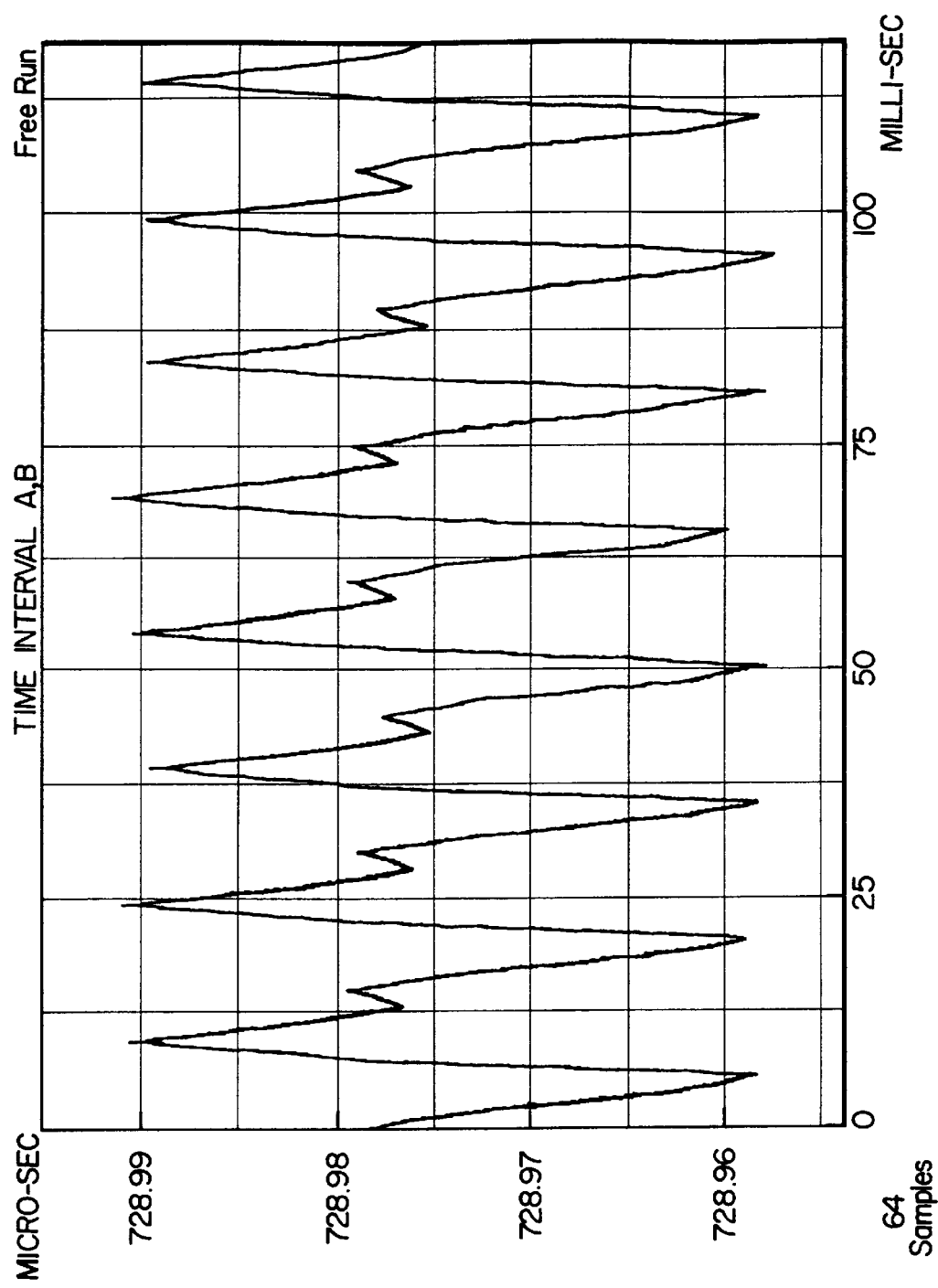
FIG. 7 is a graph illustrating the highly repeating nature of the periodic, in-scan error for eight revolutions of an eight facet polygon scan optic connected to a self-acting gas bearing according to the present invention.

FIG. 7 illustrates the highly repeating nature of in-scan error for eight revolutions of an eight facet polygon scan optic connected to the shaft of the self-acting gas bearing according to the present invention.

Figure 8:
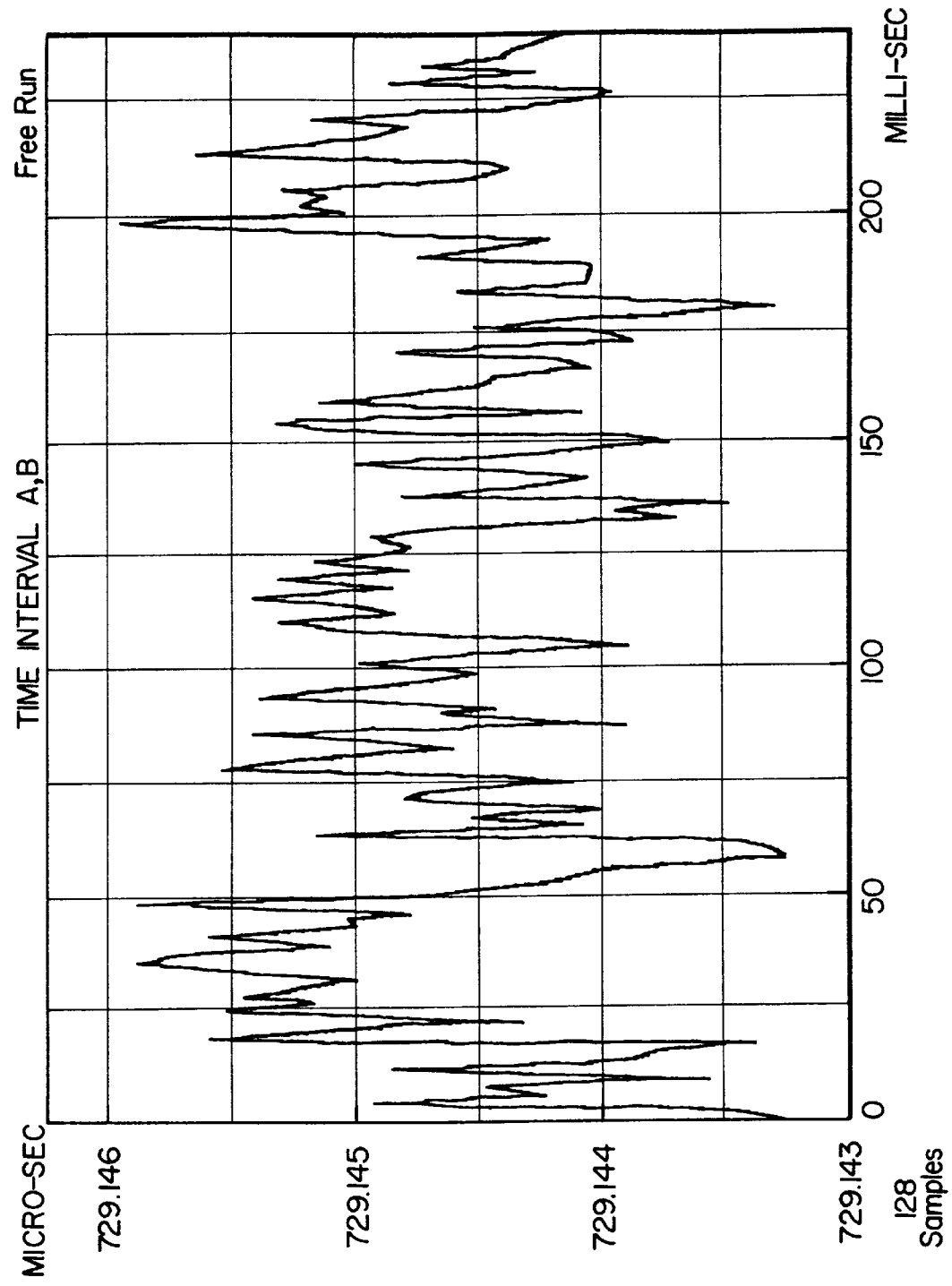
FIG. 8 is a graph that illustrates the improvement achieved by accurately measuring the highly repeatable in-scan error profile and influencing appropriate correction.

FIG. 8 illustrates the improvement achieved by applying an appropriate correction to the highly repeatable in-scan errors.

Figure 9:
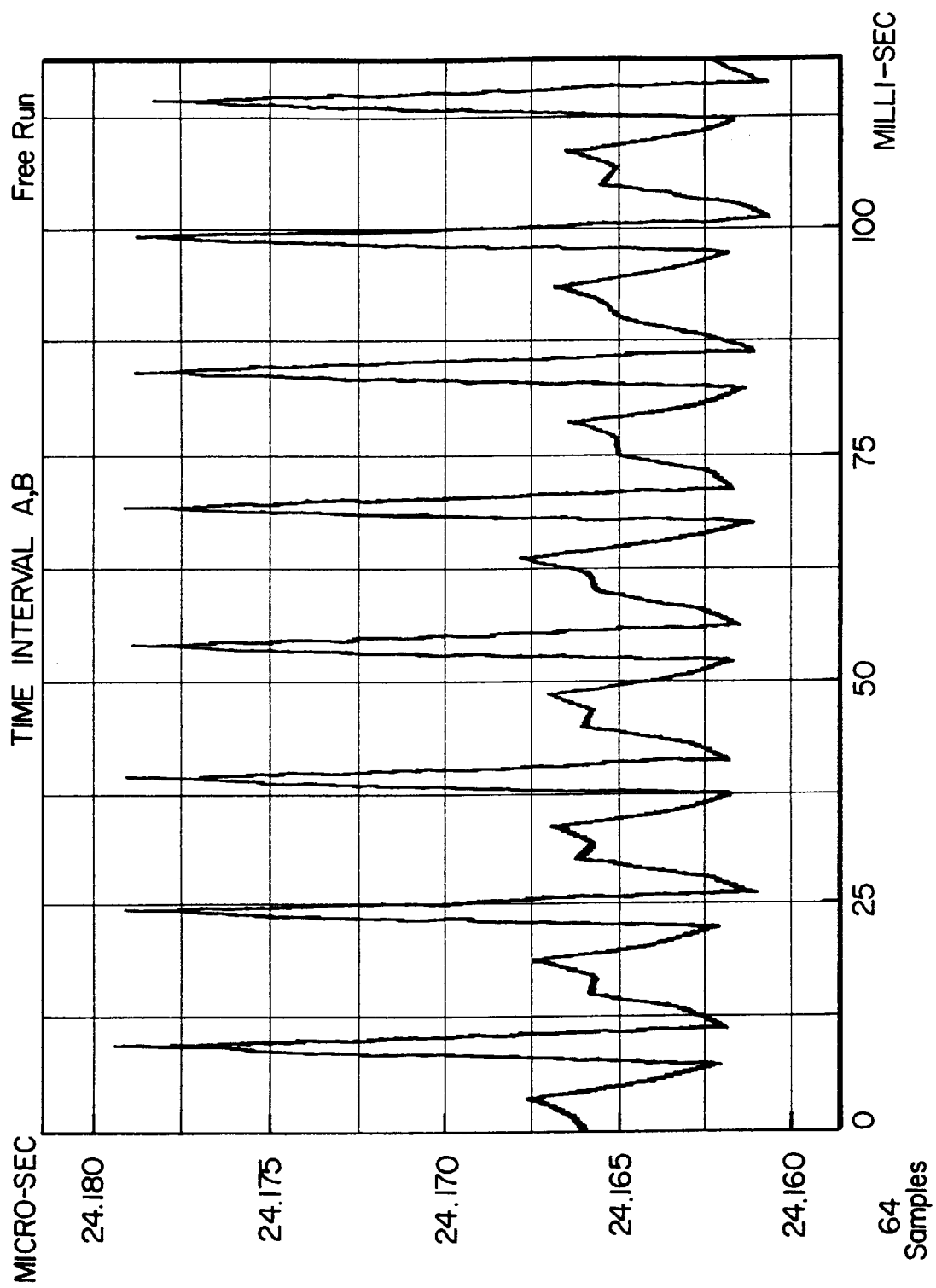
FIG. 9 is a graph that illustrates the highly repeating nature of the cross-scan error for eight revolutions of the polygon scan optic as it is rotated on a self-acting air bearing according to the present invention.

FIG. 9 illustrates the highly repeating nature of cross-scan error for several revolutions of the polygon scan optic as it is rotated on a self-acting gas bearing according to the invention.

Figure 10:
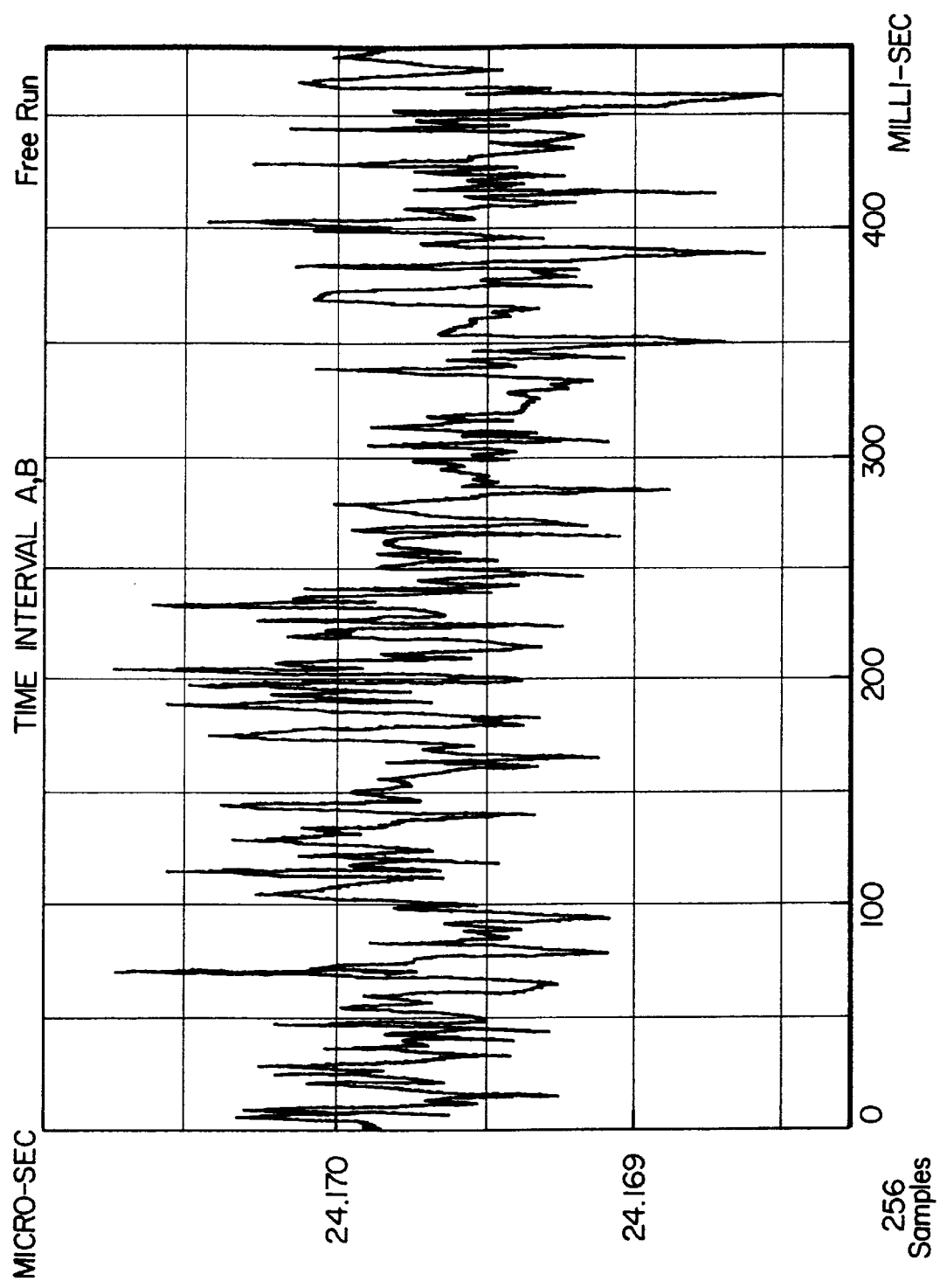
FIG. 10 is a graph that illustrates the improvement achieved by accurately measuring the highly repeatable cross-scan error profile and influencing appropriate correction.

FIG. 10 illustrates the cross-scan error after correction is implemented.

The polygon optic device 50 is contrived so that it will produce very repeatable cross-scan errors that are no worse than 10–20 times that of the final system requirements. The polygon optic device also has a velocity feedback control system that controls the short-term incremental velocity of the rotational polygon scan optic 54 to less than 1/1,000,000 of a revolution between successive revolutions. The ability to correct both the in-scan and cross-scan errors is enabled by the use of the self-acting gas bearing 88, attention to aerodynamic streamlining of the polygon scan optic 54, and the use of a separate windowed enclosure for the polygon scan optic 54 so that short-term non-repeating sources of error are negligible.

The laser beam encounters successive facets of the rotating polygon scan optic 54, and emerges essentially free of cross-scan and in-scan trajectory errors. The scanned laser beam is then encountered by a post-scan flat mirror 18 that directs the laser beam to an f-theta correcting mirror 20 which corrects the f-theta curvature of the scanned beam and directs the beam toward a second flat mirror 22 that encounters the beam and directs it to the image plane where reprographic media or other objects are scanned. The flat mirrors 18 and 22 are used to compress and position the laser beam at the desired image plane and are not essential to the basic operating principles of the invention. A spherical or aspherical powered mirror may be used for the f-theta correcting mirror 20 depending on the required imaging resolution. Use of a powered mirror to influence f-theta correction results in nearly telecentric imaging performance. Many arrangements of flat mirrors, powered mirrors and the like are possible without departing from the present invention.

A separate conveyor or capstan roller transport mechanism 72, operating at a constant velocity, and which is not a part of the disclosed invention, is required to present the media 70 or any other object to be scanned to the disclosed polygon scanning system 10.

Fiber optic coupling of diode lasers is a commonly applied technique to produce a more refined Gaussian beam profile than is possible by direct imaging of the lasing element of the diode laser itself. Another variation of the invention is to mount the end of a fiber optic strand of a fiber coupled laser diode onto the end of an electro-mechanical linear actuator. Effectively, the source of laser light from the laser diode now undergoes the exact linear motion profile as that of the actuator without having to exert vibrational acceleration stresses on the laser diode itself as occurs in the embodiment illustrated in FIG. 3.

Another variation of the proposed invention is the attachment of the end of a fiber optic strand onto the end of an electro-mechanical actuator except that the laser light source that is coupled to the fiber optic strand may be gas laser. Significant power transmission, low inertia, high frequency response, and good beam quality are realized by use of a fiber coupled laser in the context of the disclosed invention and the means for cross-scan correction.

Variations of the beam conditioning subsystem may include fiber optic coupling of the laser diode or gas laser, fiber optic coupling of three lasers into common path collimating lenses, focusing lenses or reflecting optical elements to produce the desired beam quality, focal length, and other optical parameters typical of systems of this kind.

While the invention has been described in terms of a preferred embodiment with reference to several alternative embodiments, it should be apparent to one skilled in the art that variants and substitutes to the elements of the above described invention can be adopted without departing from the present invention. Accordingly, the scope of the present invention is to be limited only by the following claims.

What is claimed is:

1. A method of using a polygon scanner, said method comprising the steps of:

(a) providing a source of a laser light;

(b) reflecting the laser light off of the facets of a polygon scan optic such that laser light is reflected onto a respective location on an imaging surface;

(c) analyzing the actual location of the laser light on the imaging surface compared to the intended location on the laser light imaging surface;

(d) determining the difference between the actual location and the intended location of the laser light and resolving the difference into a cross-scan error component and an in-scan error component;

(e) determining a repeating portion and a non-repeating portion of the cross-scan error component;

(f) verify that the repeating portion of the cross-scan error component is significantly larger than the non-repeating portion of the cross-scan error component;

(g) mapping the repeating portion of the cross-scan error component; and (h) correcting the polygon scanner actively to offset the repeating portion of the cross-scan error component such that the difference between the actual location and the intended location of the laser light becomes smaller.

2. A method according to claim 1 wherein the step of correcting the polygon scanner includes adjusting the position of the source of the laser light.

3. A method according to claim 1 further comprising the steps of:

(a) determining a repeating portion and a non-repeating portion of the in-scan error component;

(b) verifying the repeating portion of the in-scan error component is comparatively significantly larger than the non-repeating portion of the error component;

(c) mapping the repeating portion of the in-scan error component; and (d) correcting the polygon scanner actively to offset the repeating portion of the in-scan error component by adjusting the rotational velocity of the polygon scan optic such that the difference between the actual location and the intended location of the laser light becomes smaller.

4. A method according to claim 2 further comprising the steps of;

(a) determining a repeating portion of the cross-scan error component;

(b) mapping the repeating portion of the cross-scan error component; and (c) correcting the polygon scanner actively to offset the repeating portion of the cross-scan error component by adjusting the velocity of the polygon scan optic such that the difference between the actual location and the intended location of the laser light becomes smaller.

* * * * *

UNITED STATES PATENT AND TRADEMARK OFFICE
CERTIFICATE OF CORRECTION

PATENT NO.  : 5,999,302
DATED       : December 7, 1999
INVENTOR(S) : Sweeney et al.

It is certified that error appears in the above-identified patent and that said Letters Patent is hereby corrected as shown below:

Column 1,
Line 58, delete "fall" and insert -- full --.

Column 6,
Line 59, delete "fall" and insert -- full --.

Column 8,
Line 21, delete "streamling" and insert -- streamlining --.

Column 9,
Line 2, delete the comma "," and insert a semi-colon -- ; --.

Column 11,
Line 36, delete the period "." and insert a semi-colon -- ; --.
Line 39, delete the period "." and insert a semi-colon -- ; --.
Line 58, after the semi-colon ";" insert -- and --.

Column 12,
Line 12, after "102" insert -- and -- .
Column 13,
Line 12, after "data" insert a period -- . --.

Column 14,
Line 54, before "conditioning" insert -- laser --.
Line 60, delete "an" and insert -- the --.

UNITED STATES PATENT AND TRADEMARK OFFICE
CERTIFICATE OF CORRECTION

PATENT NO. : 5,999,302
DATED : December 7, 1999
INVENTOR(S) : Sweeney et al.

It is certified that error appears in the above-identified patent and that said Letters Patent is hereby corrected as shown below:

Column 17,
Line 15, delete "verify" and insert -- verifying --.

Signed and Sealed this

Fifth Day of March, 2002

Attest:

JAMES E. ROGAN
*Attesting Officer*     *Director of the United States Patent and Trademark Office*